(12) United States Patent  (10) Patent No.: US 8,175,387 B1
Hsieh et al.  (45) Date of Patent: May 8, 2012

(54) IMAGE SIMILARITY DETECTION USING APPROXIMATE PATTERN MATCHING

(75) Inventors: Sheng-chi Hsieh, Xindian (TW); Jui-pang Wang, Banciao (TW)

(73) Assignee: Trend Micro, Inc., Tokyo (JP)

( * ) Notice: Subject to any disclaimer, the term of this patent is extended or adjusted under 35 U.S.C. 154(b) by 1182 days.

(21) Appl. No.: 11/857,845

(22) Filed: Sep. 19, 2007

(51) Int. Cl.
*G06K 9/00* (2006.01)
(52) U.S. Cl. ........................................................ 382/181
(58) Field of Classification Search ........... 382/181–231
See application file for complete search history.

(56) References Cited

U.S. PATENT DOCUMENTS 6,081,621 A * 6/2000 Ackner .......................... 382/216
2002/0001409 A1 * 1/2002 Chen et al. ..................... 382/167

OTHER PUBLICATIONS

VIMA Technologies Inc.; www.vimatech.com; Clustering Images in Spam: Theory and Design; 62 pgs.

* cited by examiner

*Primary Examiner* — Alex Liew
(74) *Attorney, Agent, or Firm* — Beyer Law Group LLP

(57) ABSTRACT

Two images are compared to determine how similar they are. First, a process normalizes each image, then horizontal and vertical byte sequences are derived from each image. A similarity formula is used to obtain a similarity value that represents the similarity between the two images. An approximate pattern matching algorithm is used to determine the error distance between the horizontal byte sequences for the images and to determine the error distance between the vertical byte sequences for the images. The error distances and the length of the byte sequences are used to determine the similarity value. Padding is used to make the aspect ratios the same.

30 Claims, 11 Drawing Sheets

IMAGE SIMILARITY DETECTION USING APPROXIMATE PATTERN MATCHING

FIELD OF THE INVENTION

The present invention relates generally to image processing. More specifically, the present invention relates to detecting similar images by image comparison

BACKGROUND OF THE INVENTION

It is desirable to be able to detect when two images are the same, similar or different. Prior art techniques usually apply complex mathematical formulas and take a great deal of computing resources such as processor time and memory. For example, VIMA Technologies of Santa Barbara, Calif. has a technology for image spam detection, but the feature extraction of VIMA's approach is complex: it refers to the intensity of entire image (2-D edge feature), and it refers to the representation of image gradient orientations (SIFT feature). Further, VIMA's approach to image clustering and distance computation is also complex and time consuming.

It would be desirable to provide a more efficient technique for detecting similar images. Further, it would be desirable to use this technique to detect e-mail scams such as phishing and to detect e-mail image spam.

SUMMARY OF THE INVENTION

To achieve the foregoing, and in accordance with the purpose of the present invention, an image similarity detection technique is disclosed that uses approximate pattern matching to efficiently detect the similarity of two images. The present application provides a simple and non-resource intensive technique to determine the similarity between images that have been cropped, resized, shifted in a particular direction, subjected to substitutions, deletions, additions, et cetera.

In the prior art, approximate pattern matching algorithms have been used to compare two files to understand the differences between them, or to compare two strings, sequences or lists. Advantageously, the present invention uses an approximate pattern matching algorithm on sequences that are derived from images, in order to determine the difference or similarity between two images.

An embodiment of the present invention first normalizes the two images, then transforms each image into horizontal and vertical byte sequences, and then applies a similarity formula to obtain a similarity value that represents the similarity between the two images.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

Figure 1:
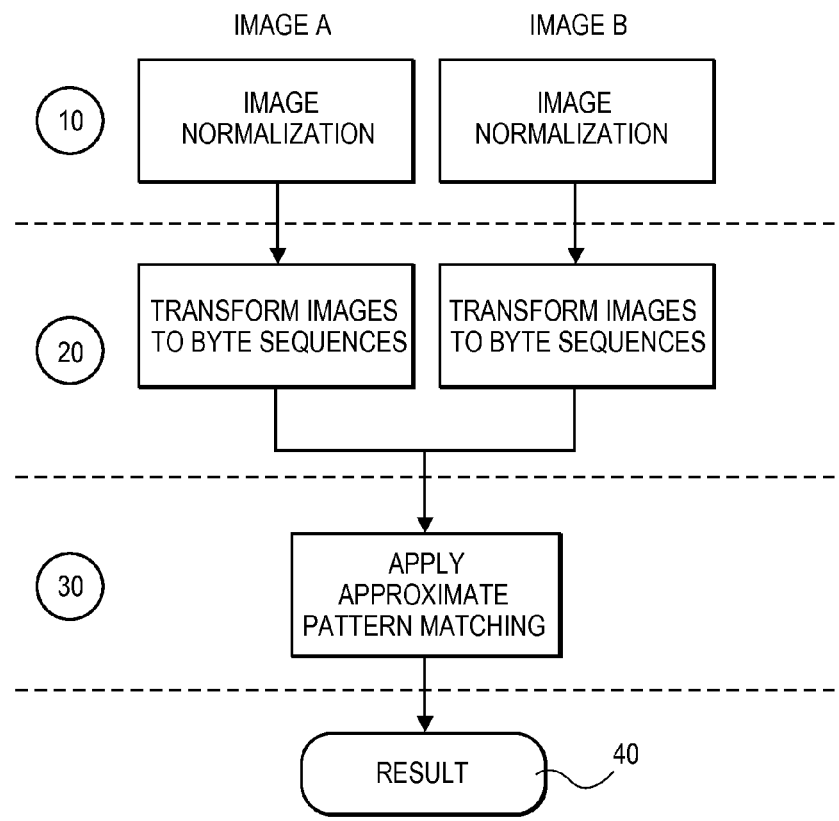
FIG. 1 is a flowchart describing one technique for implementing the present invention.

FIG. 1 is a flowchart describing one technique for implementing the present invention. Input are two images, namely image A image B, and the technique is used to determine the similarity of these images. The images may be exactly the same, radically different or somewhere in between, such as being quite similar. Any computer image may be used in any desired format such as GIF, TIFF, JPEG, PNG, IMG, BMP, etc.

In step 10 image normalization is performed upon each image. As is known in the art, the purpose of normalization is to bring the image into a range more normal to the senses or for ease of comparison between two images. Normalization may also reduce noise in an image. Once two images are normalized, they may be more readily compared in order to detect substantive differences between the images. For example, two images might show exactly the same picture yet one is in black and white and one is in color. A mathematical comparison of two such images might indicate that the images are radically different, when in fact they are the same. Any of a wide range of normalization techniques may be used that result in images that are more readily compared to determine substantive differences.

In one particular embodiment, image normalization involves conversion to grayscale, conversion to a GIF format, and resizing of the image. As is known in the art, a grayscale image is an image in which each pixel has a value indicating a particular shade of gray in the range from white to black. Grayscale images are composed of shades of gray, varying from black at a low intensity to white at the strongest intensity. Pixels may also be of shades of another color instead of black and white. Grayscale images typically have 256 shades of gray, ranging from a value of 0 up to a value of 255. In other embodiments, certain grayscale images use 10, 12 or even 16 bits per sample (instead of 8 bits) resulting in many thousands of shades of gray.

Both images A and B are converted to the same grayscale image, preferably, a 0-255 grayscale image. If an image is already in grayscale, step 10 converts the existing image into a 0-255 grayscale image using well-known techniques. If an image is in color, known techniques are used to convert the image. Many software libraries may be used to convert color images to grayscale images (such as 8-bit grayscale images), resize images and convert between formats, such as converting to a GIF format. Libraries such as the GD library (www.libgd.org) and the ImageMagick library (www.imagemagick.org) may be used. These libraries may also be used to create, edit and compose images. A variety of formats can be read and converted including DPX, EXR, GIF, JPEG, JPEG-2000, PDF, PhotoCD, PNG, Postscript, SVG, TIFF, et cetera. Also, a variety of software tools may be used to perform resizing or conversion, and the following are available to convert images to grayscale: Photoshop and Gimp (gimp.org).

Once the images are converted to grayscale, then each image is also preferably converted to GIF format. The images may also be converted into a different format, although it is found that GIF format works well. Any of the above libraries or software tools may be used for this conversion.

The images are also resized to fixed dimensions; it is preferable if images of the same size are compared. One benefit of resizing is to reduce noise in an image. In one particular embodiment, each image is resized to have a width in the X direction of 100 pixels and the height in the Y direction is dictated by the aspect ratio of the image. Of course, the width in the X direction may be resized to any dimension, or may be configurable It is preferable to maintain the aspect ratio of each image when resizing each image. Any aspect ratio is suitable, although it is preferable if both images have the same aspect ratio or nearly similar. For example, if an image A has a size of 100 pixels by 20 pixels, and image B has a size of 100 pixels by 100 pixels, then those sizes are substantially different. But, if the image B has a size of 100 pixels by 30 pixels, then those sizes are fairly similar and the invention is suitable for use on those two images.

As is known in the art, the aspect ratio of an image is its displayed width divided by its height. For example, the standard ratio for television screens is 4:3, and the new modern standard is 16:9 used in high-definition television. Two images that have different aspect ratios but have the same vertical height, will necessarily have different widths, and vice versa. There are a great number of aspect ratios used and the present invention is suitable for any aspect ratio. If the images have the same aspect ratio and the same size then image padding (as described herein) may not be necessary, and the images will thus have a chance to have a higher similarity value.

In one specific embodiment of the invention, the grayscale conversion step is performed first and the steps of conversion to GIF format and resizing are performed afterward.

Alternatively, the resizing sub-step may occur before the conversion to GIF format sub-step. Or, conversion to grayscale may be performed after either of the other steps.

Next, step 20 transforms each image into an X byte sequence and a Y byte sequence. In other words, two byte sequences are produced for each image as described in FIGS. 3 and 4. Finally, step 30 uses an approximate pattern matching algorithm along with the byte sequences to determine a similarity value.

Figure 3:
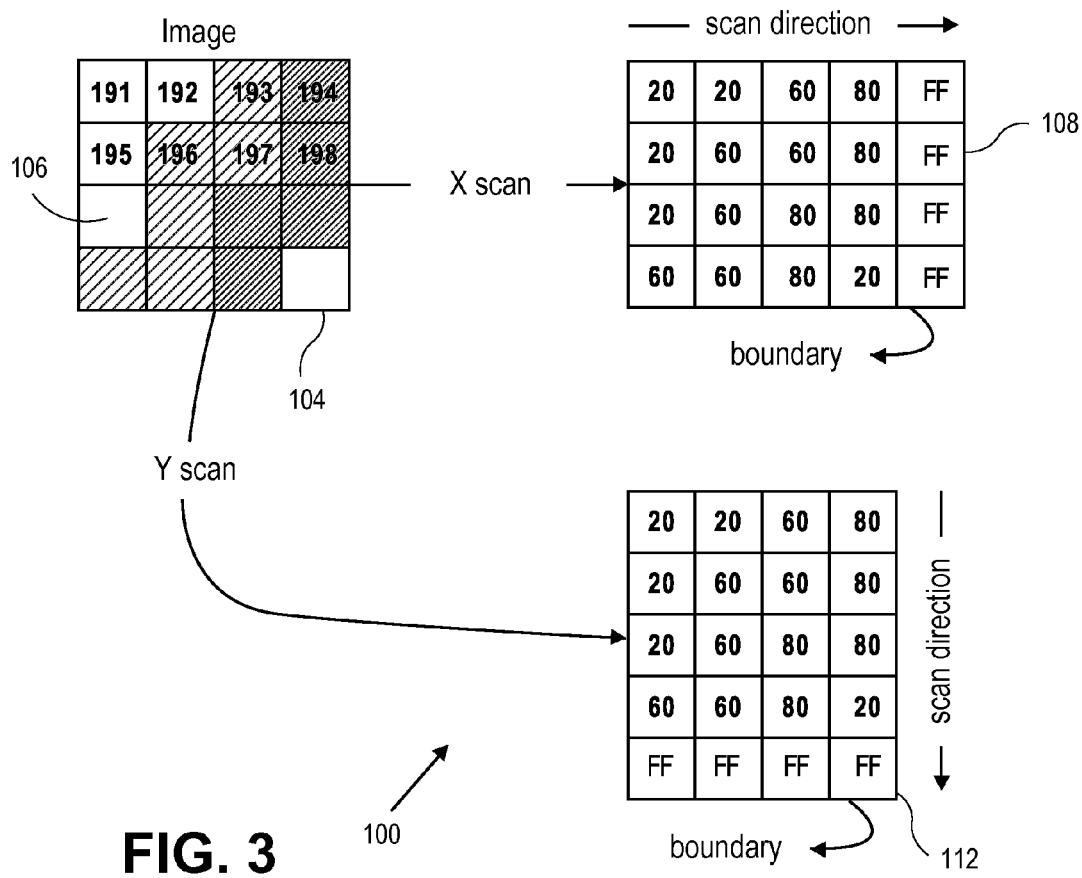
FIG. 3 illustrates a process for producing byte sequences from an image.

FIG. 3 illustrates a process 100 for producing byte sequences from an image 104. Image 104 includes individual pixels having pixel values, such as pixel 106 that has a value of 20. Pixel values are shown in hexadecimal ranging from a value of 0 up to a value of FF. To produce an X byte sequence, image 104 is conceptually modified by appending a value of FF to the boundary of each row to produce values such as shown in table 108. Correspondingly, to produce a Y byte sequence, image 104 is conceptually modified by appending a value of FF to the boundary of each column to produce values such as shown in table 112. The X byte sequence is produced by scanning the image from left-to-right, top-to-bottom and recording the value of each pixel and by appending the value FF to the end of each row as shown in table 108. The Y byte sequence is produced by scanning the image from top-to-bottom, left-to-right and recording the value of each pixel and by appending the value FF to the bottom of each column as shown in table 112.

Figure 4:
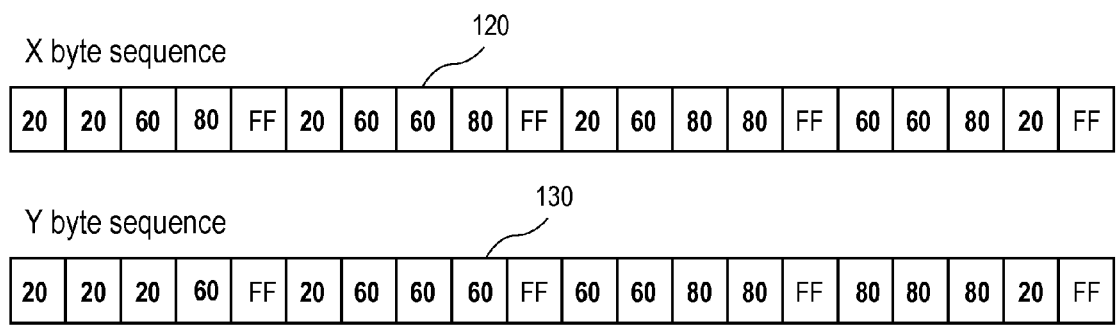
FIG. 4 illustrates the X byte sequence and the Y byte sequence produced by scanning the image of FIG. 3.

FIG. 4 illustrates the X byte sequence 120 and the Y byte sequence 130 produced by scanning image 104 of FIG. 3. The boundary value FF is reserved and any value FF found in the image will be replaced by the value FE to present any conflict. Or, one may choose another value as a boundary pixel, such as 0x00, and replace 0x00 in the image by 0x01 instead. Or, one may mark the boundary pixel by an extra flag in an application program, thus indicating it is a special pixel. The matching algorithm would be aware of this flag. This implementation would need extra memory space for flags, and may slow the comparison process.

Figure 5:
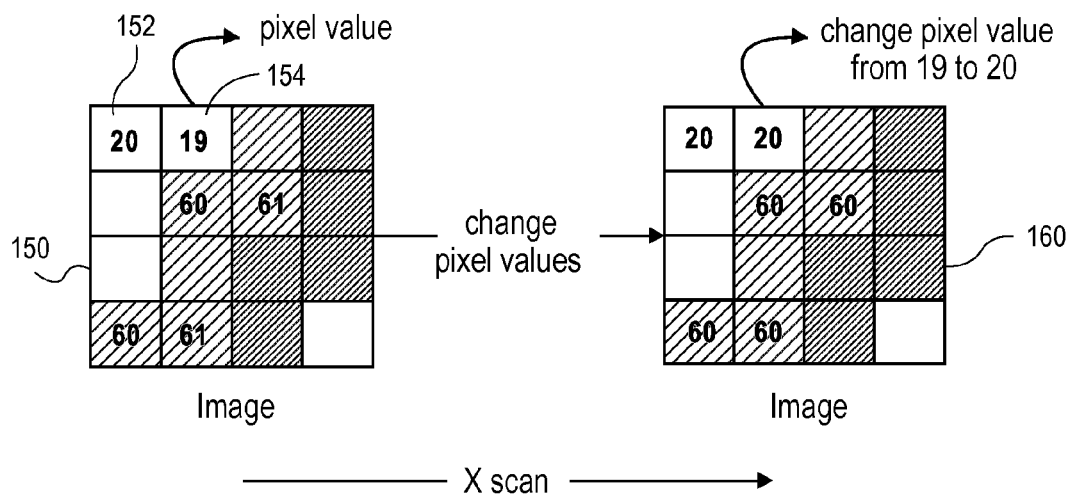
FIG. 5 illustrates an alternative embodiment of the step of producing byte sequences in which pixel values may be changed.

FIG. 5 illustrates an alternative embodiment of the step of producing byte sequences in which pixel values may be changed. Table 150 represents an image having pixel values 20 and 19 in the first row. Modified table 160 illustrates how the pixel value 19 has been changed to a value 20. Modified table 160 is then used during an X scan to produce an X byte sequence. In general, during a scan in the X direction or in the Y direction, a pixel value may be changed if it has a similar grayscale value to the immediately preceding pixel value in the scan. In one specific embodiment, if the current pixel value +3 is not greater than or equal to the value of the previous pixel, than the current pixel value remains unchanged, otherwise it will be changed. For example, noting that pixel 152 has a value of 20, if pixel 154 has a value of 17 it will be changed to a value of 20, whereas if pixel 154 has a value of 16 it will not be changed. Of course, other ranges may be used to determine whether or not to change a particular pixel value. Preferably, a current pixel is only compared to the immediate previous pixel value, and is compared to the changed value of that pixel (if it is changed) thus, this changing of pixel values may have a ripple effect in the X direction or in the Y direction. These pixel value changes are preferably not propagated from row to row.

Figure 6:
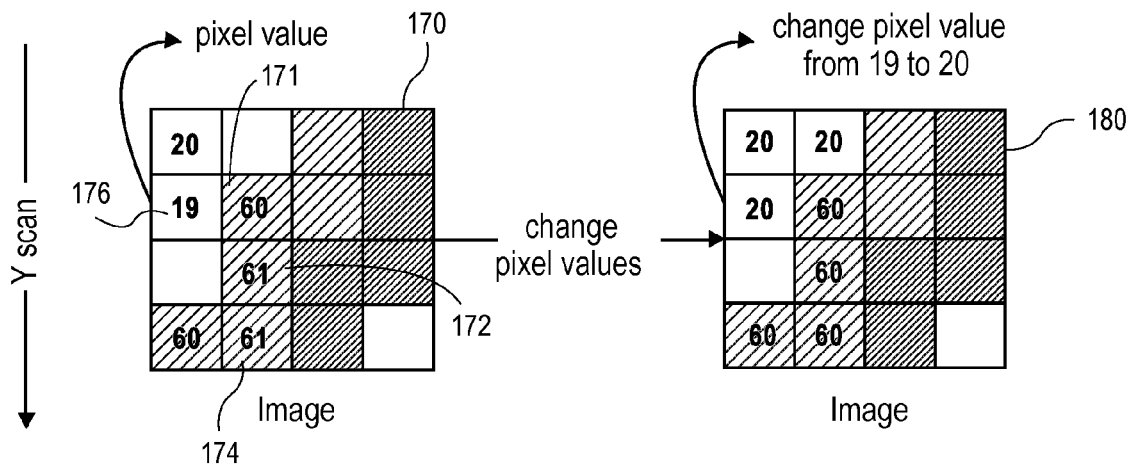
FIG. 6 illustrates the concept from FIG. 5 operating in the Y direction.

FIG. 6 illustrates the concept from FIG. 5 operating in the Y direction. Shown is table 170 holding pixel values representing an image and table 180 holding modified pixel values. As shown, pixel values 172 and 174 have both been changed to a value of 60 because pixel 171 has a value of 60. Similarly, pixel 176 has its value changed from 19 to 20. This sub-step of changing pixel values based upon the immediate previous pixel value in a particular scan direction is optional, although it is preferable as it produces better results.

As shown in image 104 of FIG. 3, pixels 191 and 192 may be formed into a first group and pixels 193 and 194 may be formed into a second group. These two groups may then be compared as discussed above. Or, pixels may be grouped into squares or rectangles for comparison purposes. For example, pixels 191, 192, 195 and 196 may be formed into a first group, and then compared with a second group of pixels 193, 194, 197 and 198. Of course, this grouping and comparison of pixels in the X direction may also be repeated in the Y direction during a Y scan as well. Grouping pixels in this fashion for the purposes of determining whether or not to change particular pixel values is optional and although it speeds up processing, is generally not preferable as the results will not be as good as not grouping pixels.

Image padding may also be used when comparing two images with different aspect ratios. Preferably, images are padded to achieve the same aspect ratio, thus providing more accurate similarity results.

Figure 12:
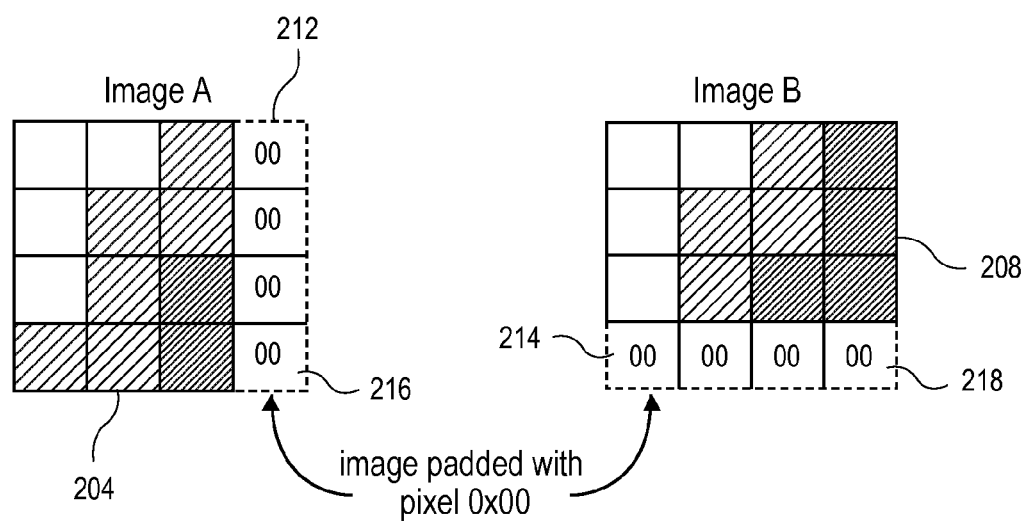
FIG. 12 shows images having different aspect ratios.

FIG. 12 shows images 204 and 208 having different aspect ratios. Column 212 and row 214 are added with extra padding pixels. The padding pixels may be filled with 0x00 (for example), and any pixel value 0x00 in the image is replaced by 0x01 (for example). In one embodiment, the extra padding pixels are not treated as identical when comparing images. For example, the two padding pixels that are in the right-bottom corner of both images, 216 and 218, although they are both 0x00, will not be treated as being the same. These pixels will be treated as being different. Thus, pixels added simply for padding do not make two images appear more similar. See the example in FIG. 13 for details.

Compare Images

Step 30 of FIG. 1 uses an approximate pattern matching algorithm along with the X and Y byte sequence lengths in determining a similarity value. Although approximate pattern matching algorithms have been used in the past to compare text, the present invention realizes that such an algorithm may be used to compare byte sequences that are derived from images, thus utilizing the power of a pattern matching algorithm to compare images. A pattern matching algorithm may be used to determine an "error distance" used in a similarity equation, such as that shown below. A similarity value of "1" means the two images are the same, while a similarity value approaching "0" means the images are different. The similarity value may be calculated by using the following equation:

$$similarity = 1 - (X\ error\ distance + Y\ error\ distance)/(X\ byte\ sequence\ length + Y\ byte\ sequence\ length)$$

The X byte sequence length is the sum of the two X sequence length of the images and the Y byte sequence length is the sum of the two Y sequence lengths of the images. Once a similarity value has been calculated, this value is returned as result in step 40 of FIG. 1. The above similarity equation makes use of the error distance between the X byte sequences of the images and the error distance between the Y byte sequences of the images; the error distance is sometimes referred to as the "byte errors" between the sequences.

In one embodiment of the invention, an approximate pattern matching algorithm is used to determine the error distance between two byte sequences (i.e., between the X byte sequences of the two images and between the Y byte sequences of the two images). An error distance value is determined between the X byte sequences and between the Y byte sequences. Descriptions of suitable approximate pattern matching algorithms are described in the books *The Algorithm Design Manual*, Steve S. Skiena, *Flexible Pattern Matching in Strings: Practical Online Search Algorithms for Texts and Biological Sequences*, Gonzalo Navarro, and in *Algorithms on Strings, Trees and Sequences: Computer Science and Computational Biology*, Dan Gusfield, each of which is hereby incorporated by reference.

In general, techniques for finding strings that approximately match a given pattern string are also known as fuzzy string search techniques or inexact matching. Approximate pattern matching algorithms typically use a similarity function, most commonly the Levenshtein distance (also called the "edit distance"). An approximate pattern matching algorithm when applied to two strings will typically produce the number of insertions, deletions and substitutions needed to transform the first string into the second string. For example, the Levenshtein distance between the two words (or strings) "kitten" and "sitting" is "3," because three operations or edits are needed to change one into the other, and the change cannot be performed with less than three edits. Other generalizations and variations of this distance are also possible and are known to those of skill in the art.

Figure 2:
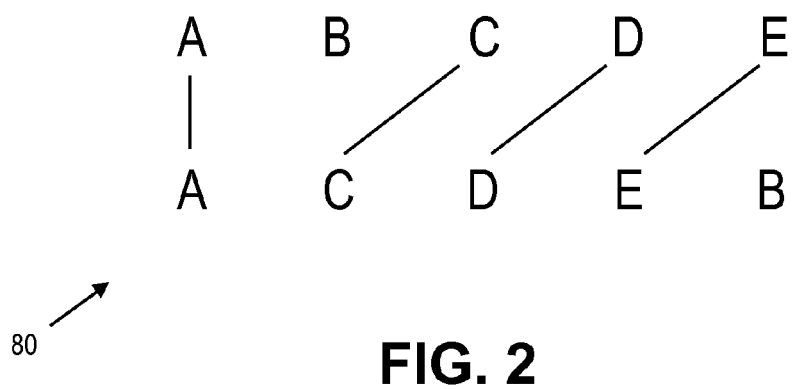
FIG. 2 illustrates a simple example of approximate pattern matching.

FIG. 2 illustrates a simple example. Consider the two strings "a b c d e" and "a c d e b." The first letters match, the second letters do not match, but the letters "c d e" in the first string does match the same string "c d e" in the second string, although the first set of letters is shifted over by one place. Accordingly, the last letter of the second string has no match in the first string. The error distance in this example is "2" because of the two mismatches. Looking at it another way, the second string could be converted into the first string by inserting the letter "b" after the first letter and then by deleting the final letter of that string. Thus, one insertion and one deletion are needed, resulting in an error distance of "2."

In general, a suitable approximate pattern matching algorithm or a similarity function (such as the Levenshtein distance) will produce as a result the number of insertions, deletions and substitutions needed to transform a first string into a second string. In a preferred embodiment of the invention, the error distance is the sum of these insertions, deletions and substitutions. In other embodiments, the error distance may simply be the sum of the insertions and deletions (for example), or may be any suitable combination (or function) of the insertions, deletions and substitutions.

Approximate pattern matching algorithms are widely used in spelling check software and in Internet search engines. For example, if one were to type "similarity" into an Internet search engine, the engine would respond "do you mean 'similarity'?" Such is an application of approximate pattern matching. Software tools for file comparison also use this algorithm, such as the tools "ExamDiffPro" available from Presto Soft, and "WinDiff" available from Grig Software.

Accordingly, in step 30 both the X error distance and the Y error distance are calculated using a suitable approximate pattern matching algorithm as discussed above. Once these values are calculated, the byte sequence lengths are used as shown in the above equation to determine a similarity value. Step 40 outputs this numerical similarity value as a result.

Figure 7A:
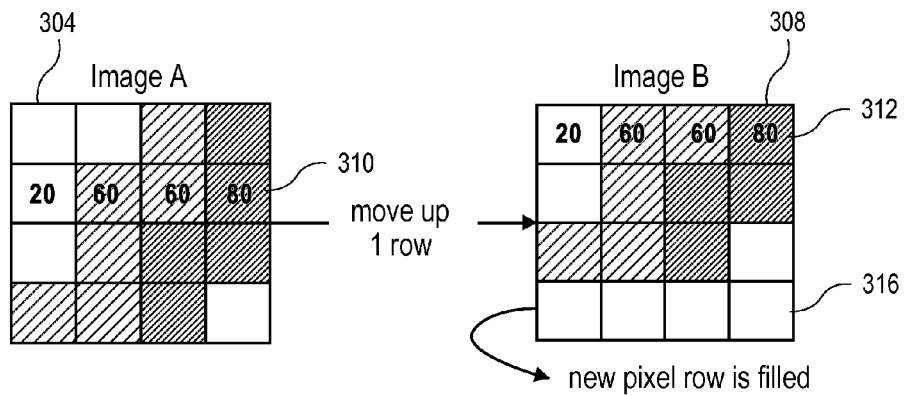
FIGS. 7A, 7B and 7C illustrate an example of using an approximate pattern matching algorithm to determine a similarity value for two images.
Figure 7B:
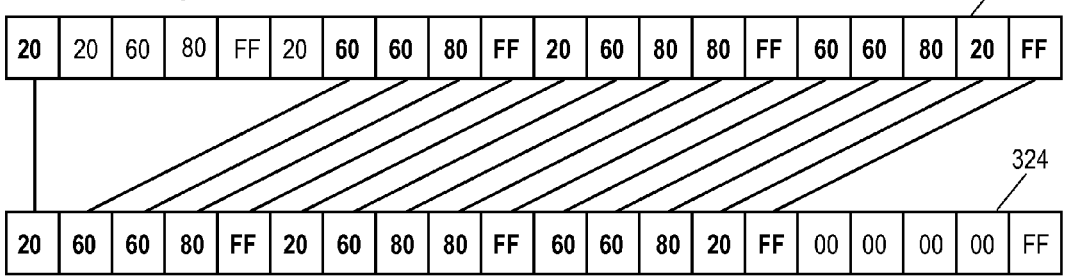
Figure 7C:
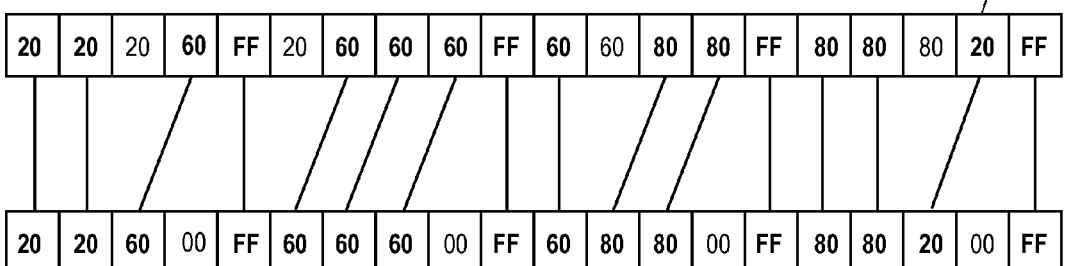

FIGS. 7A, 7B and 7C illustrate an example of using an approximate pattern matching algorithm to determine a similarity value for two images. FIG. 7A shows that image B 308 is slightly different from image A 304 in that each row has been moved up one and the last row is filled in with pixels having a value of 0x01. As shown, the second row 310 has been moved up to become the first row 312, and the final row 316 has been filled in with pixels having a value of 0x01.

FIG. 7B and FIG. 7C illustrate graphically how an approximate pattern matching algorithm may be used to determine the error distance between the X byte sequences 320 and 324 and between the Y byte sequences 330 and 334. As shown, pixel values that match between the two X byte sequences 320 and 324 are linked with a solid line. There are 10 pixel values between the byte sequences that do not match, resulting in an error distance of 10 for the X byte sequences. Further, pixel values that match between the two Y byte sequences 330 and 334 are linked with a solid line. There are 8 pixel values between the byte sequences that do not match, resulting in an error distance of 8 for the Y byte sequences. Applying the similarity equation then, the equation becomes:

$$similarity = 1 - (8+10)/80 = 0.775$$

The result then of comparing images 304 and 308 is the similarity value of 0.775 which may then be output.

Figure 8A:
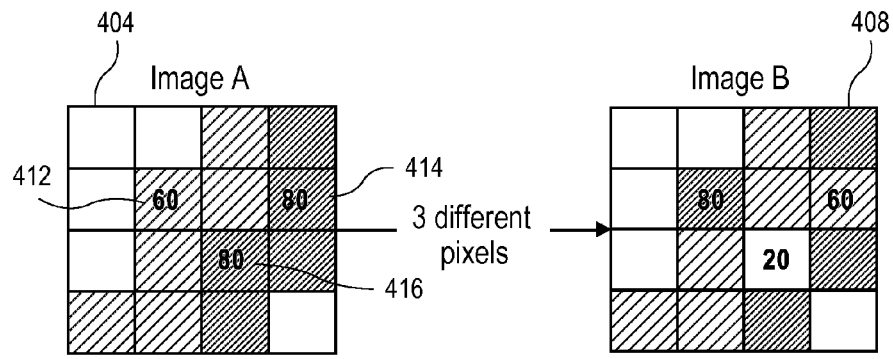
FIGS. 8A, 8B and 8C illustrate another example of using an approximate pattern matching algorithm to determine a similarity value for two images.
Figure 8B:
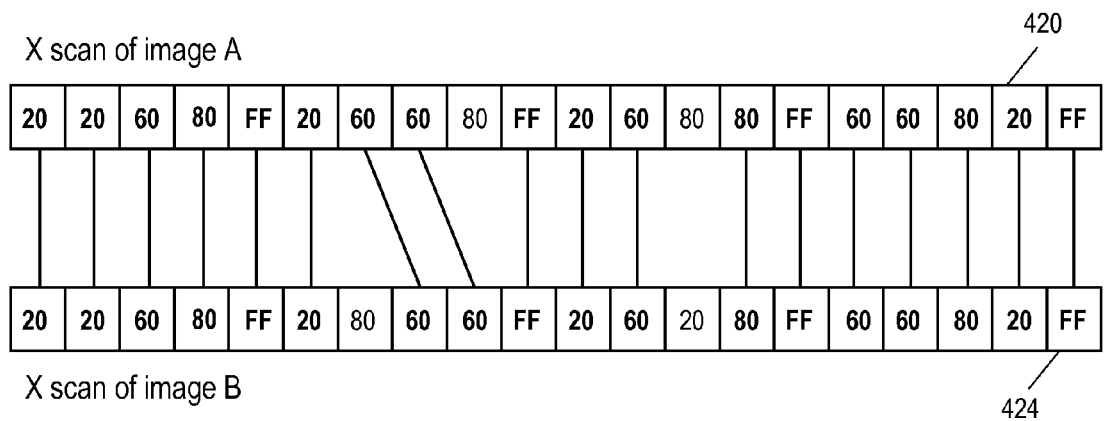
Figure 8C:
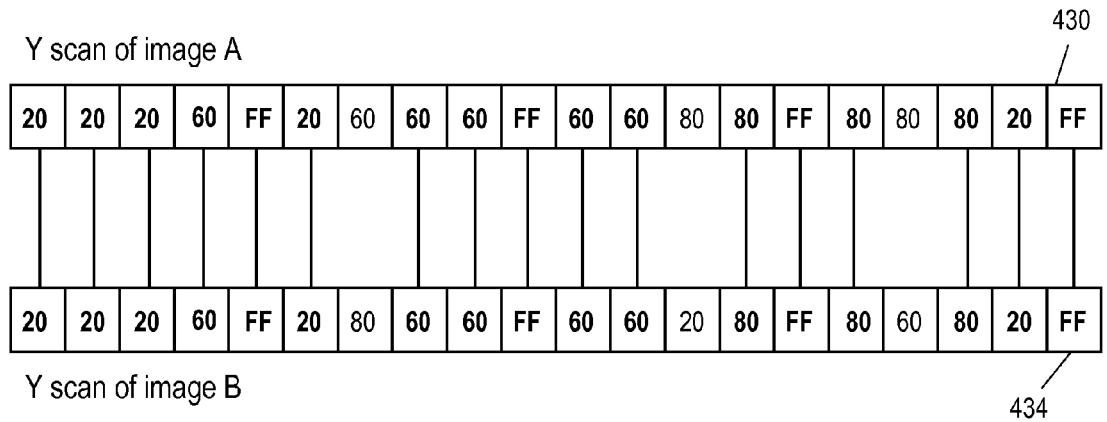

FIGS. 8A, 8B and 8C illustrate an example of using an approximate pattern matching algorithm to determine a similarity value for two images. FIG. 8A shows that image B 408 is slightly different from image A 404 in that three pixel values have been changed. As shown, pixels 412, 414 and 416 have their values changed such that the new pixel values in image B are now 80, 60 and 20, rather than 60, 80 and 80.

FIG. 8B and FIG. 8C illustrate graphically how an approximate pattern matching algorithm may be used to determine the error distance between the X byte sequences 420 and 424 and between the Y byte sequences 430 and 434. As shown, pixel values that match between the two X byte sequences 420 and 424 are linked with a solid line. There are 4 pixel values between the byte sequences that do not match, resulting in an error distance of 4 for the X byte sequences. Further, pixel values that match between the two Y byte sequences 430 and 434 are linked with a solid line. There are 6 pixel values between the byte sequences that do not match, resulting in an error distance of 6 for the Y byte sequences. Applying the similarity equation then, the equation becomes:

$$similarity=1-(4+6)/80=0.875$$

The result then of comparing images 404 and 408 is the similarity value of 0.875 which may then be output.

Figure 9A:
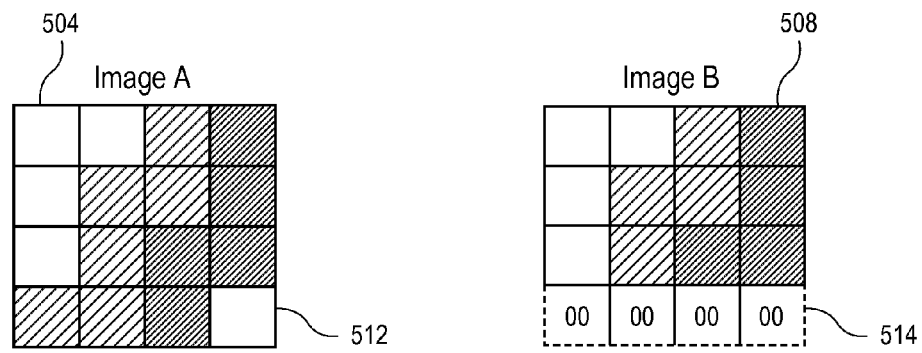
FIGS. 9A, 9B and 9C illustrate yet another example of using an approximate pattern matching algorithm to determine a similarity value for two images.
Figure 9B:
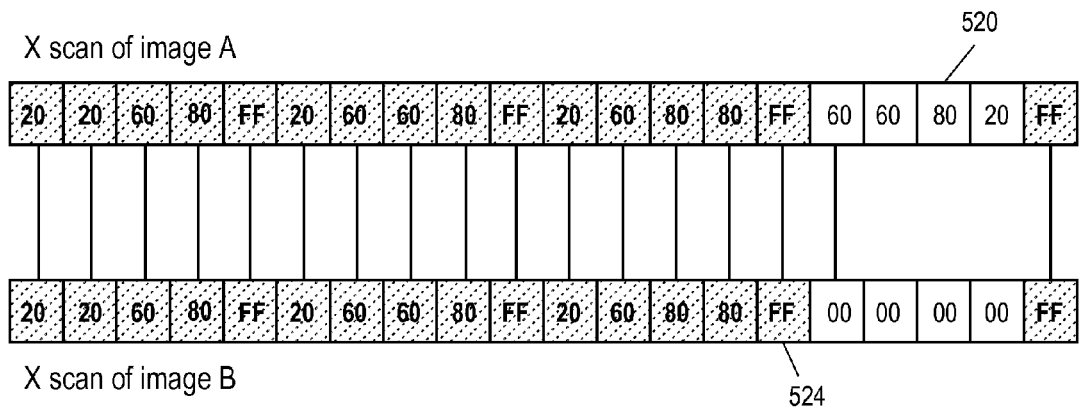
Figure 9C:
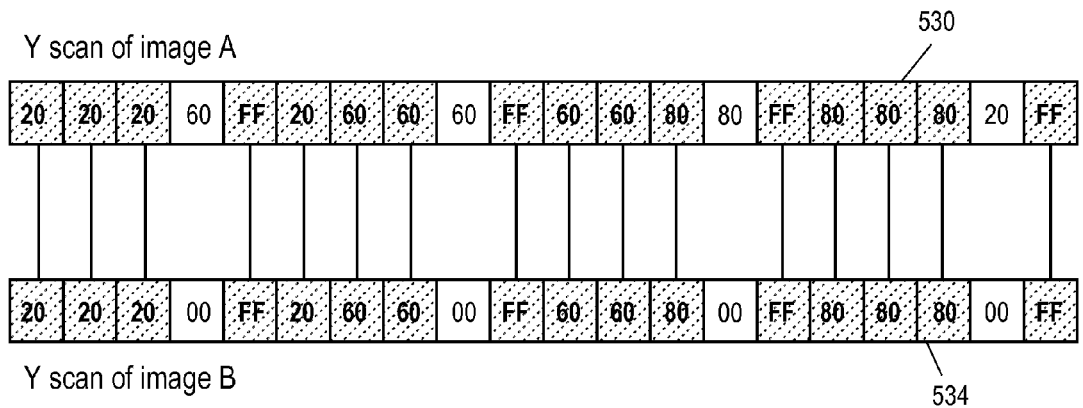

FIGS. 9A, 9B and 9C illustrate an example of using an approximate pattern matching algorithm to determine a similarity value for two images. FIG. 9A shows that image B 508 is slightly different from image A 504 in that the bottom row 512 from image 504 has been cropped. As shown, the last row of pixels 512 from image 504 is not present in the original image 508. This is an example of use of the present invention on two images having different sizes. Of course, the second image may differ in size in that more than one row is missing, columns are missing, sections of the image are not present, or that additional sections are present. Image B 508 shows that row 514 is added in order to pad image B. Row 514 is filled with 0x00, for example.

FIG. 9B and FIG. 9C illustrate graphically how an approximate pattern matching algorithm may be used to determine the error distance between the X byte sequences 520 and 524 and between the Y byte sequences 530 and 534. As shown, pixel values that match between the two X byte sequences 520 and 524 are linked with a solid line. There are 8 pixel values between the byte sequences that do not match, resulting in an error distance of 8 for the X byte sequences. Further, pixel values that match between the two Y byte sequences 530 and 534 are linked with a solid line. There are 8 pixel values between the byte sequences that do not match, resulting in an error distance of 8 for the Y byte sequences. Applying the similarity equation then, the equation becomes:

$$similarity=1-(8+8)/80=0.800$$

The result then of comparing images 504 and 508 is the similarity value of 0.800 which may then be output.

Figure 13A:
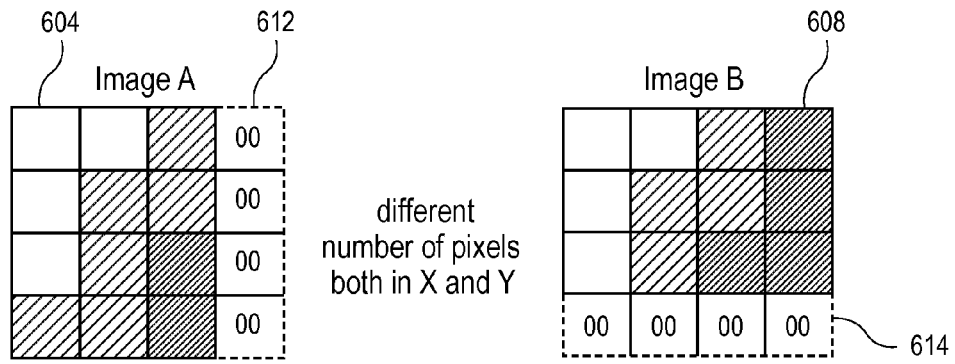
FIGS. 13A, 13B and 13C illustrate an example of using an approximate pattern matching algorithm to determine a similarity value for two images that have different aspect ratios.
Figure 13B:
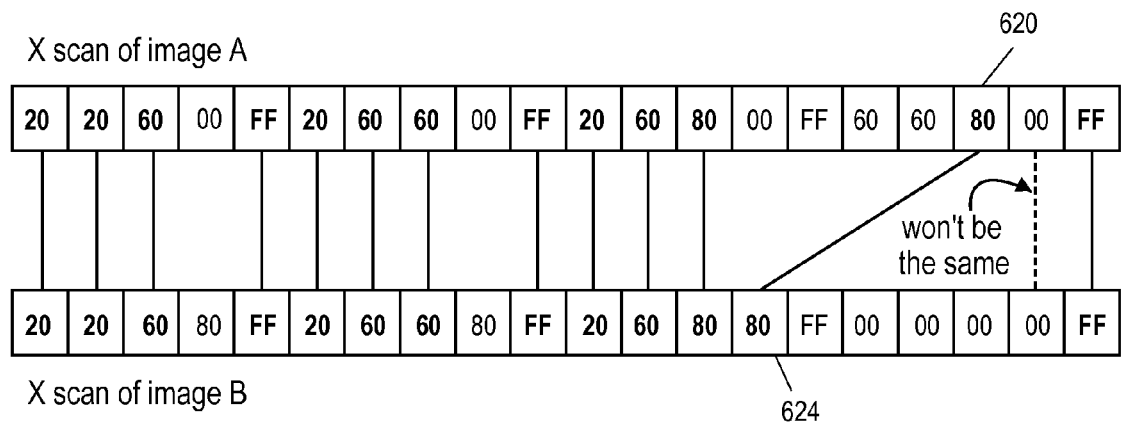
Figure 13C:
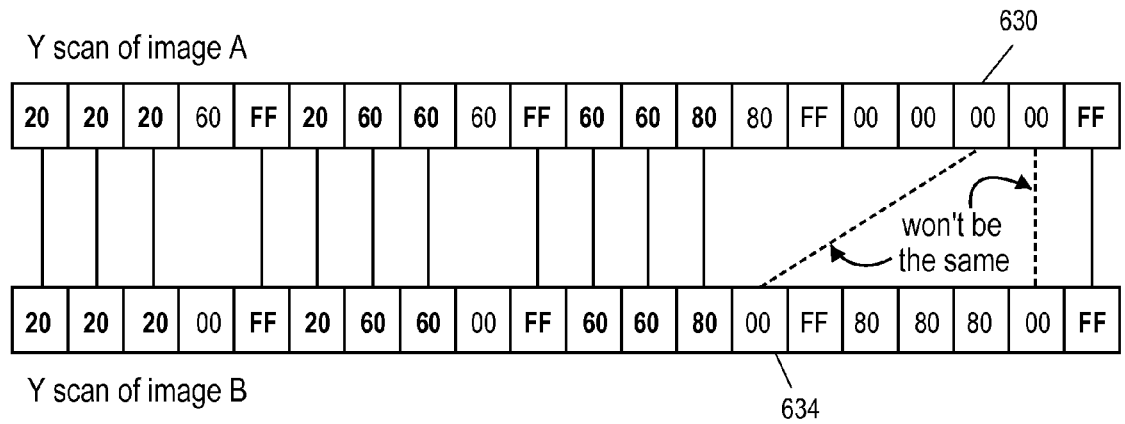

FIGS. 13A, 13B and 13C illustrate an example of using an approximate pattern matching algorithm to determine a similarity value for two images that have different aspect ratios. FIG. 13A shows that image B 608 is different from image A 604 in that the original ratios are different. Note here, both image A and image B will be padded with 0x00 before comparison to each other (added column 612 and row 614). Once the padding pixels are added, the aspect ratios are the same. The padding pixels 0x00 in both images are not treated as identical in the comparison. Of course, the second image may differ in size in that more than one row is missing, columns are missing, sections of the image are not present, or that additional sections are present. Padding pixels are added in any case to make the aspect ratios the same.

FIG. 13B and FIG. 13C illustrate graphically how an approximate pattern matching algorithm may be used to determine the error distance between the X byte sequences 620 and 624 and between the Y byte sequences 630 and 634. As shown, pixel values that match between the two X byte sequences 620 and 624 are linked with a solid line. There are 14 pixel values between the byte sequences that do not match, resulting in an error distance of 14 for the X byte sequences. Further, pixel values that match between the two Y byte sequences 630 and 634 are linked with a solid line. There are 16 pixel values between the byte sequences that do not match, resulting in an error distance of 16 for the Y byte sequences. Applying the similarity equation then, the equation becomes:

$$similarity=(1-30/80)=0.625$$

The result then of comparing images 604 and 608 is the similarity value of 0.625 which may then be output.

Applications

The above-described technique has applications in a variety of areas. For example, the technique is useful in phishing detection by comparing page snapshots, and in image spam identification.

As is known in the field, phishing involves tricking users into providing confidential information such as account names and passwords to fraudsters. One type of phishing involves sending an e-mail message to entice victims into providing their account information on a fake login page. Phishing pages can trick users because they look nearly the same as legitimate web pages; the below technique provides a phishing detection system that compares page snapshots.

Figure 10:
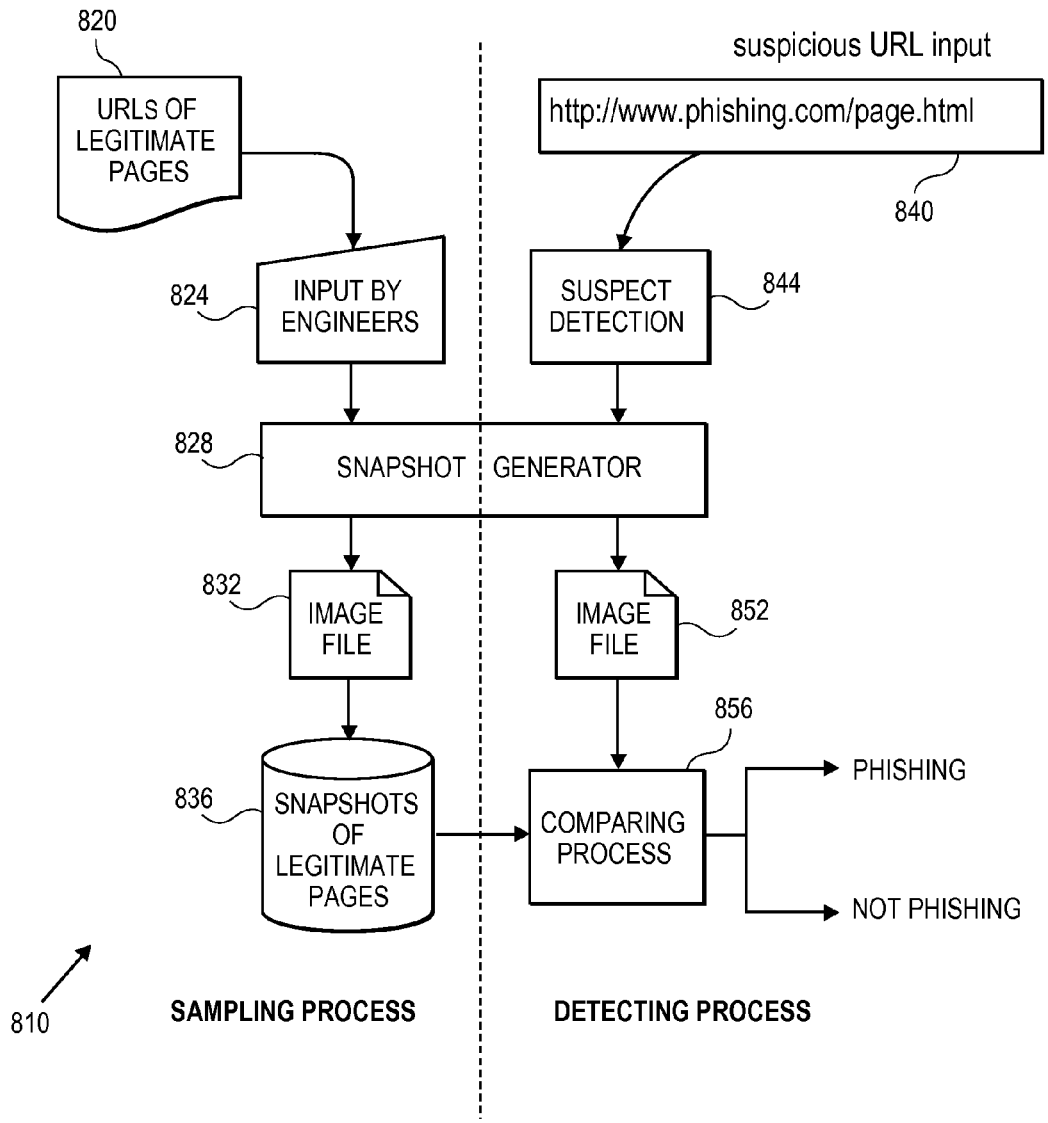
FIG. 10 illustrates a phishing detection system.

FIG. 10 illustrates a phishing detection system 810. The left side of the figure illustrates a sampling process while the right side of the figure illustrates a detecting process. The sampling process is used to generate snapshots of legitimate web pages and to save images of the snapshots into a database. Engineers 824 collect legitimate login URLs 820 from a variety of well-known web sites (such as eBay and Paypal, for example), send these URLs to a snapshot generator 828, and then these snapshots are saved as images 832 into a database 836. Snapshots in this database are refreshed periodically to ensure that the latest copies of these web sites are available once the pages have been modified.

The detecting process is invoked when any suitable screening system receives a URL 840 suspected of being a phishing page. If the received URL 840 is suspected of being a phishing page 844 (based upon any suitable criteria) then it is sent to the snapshot generator 828 in order to have an image 852 created. Comparing process 856 compares the snapshot of the suspect suspicious URL with all of the legitimate snapshots in the database. If a match is found, then the suspect URL is a phishing page because it contains an image exactly like or very nearly the same as a legitimate web site. In this embodiment, comparing process 856 uses the invention described and shown above (i.e., using approximate pattern matching) in order to determine if two images are the same or very nearly the same.

The suspect detection step 844 also has the purpose of preventing legitimate URLs from being considered as phishing pages, and to filter out those URLs which have a low probability of being a phishing page. For example, this step may include consulting a whitelist that holds legitimate host names; if the URL is in the whitelist it will not be considered a suspect. Also, phishing pages usually have features that identify them as a login page. Pages that have two or more input fields, or include keywords such as "login," "username"

or "password" are typically phishing pages. If the suspect page does not have any of these typical features it will not be considered suspect.

Figure 11:
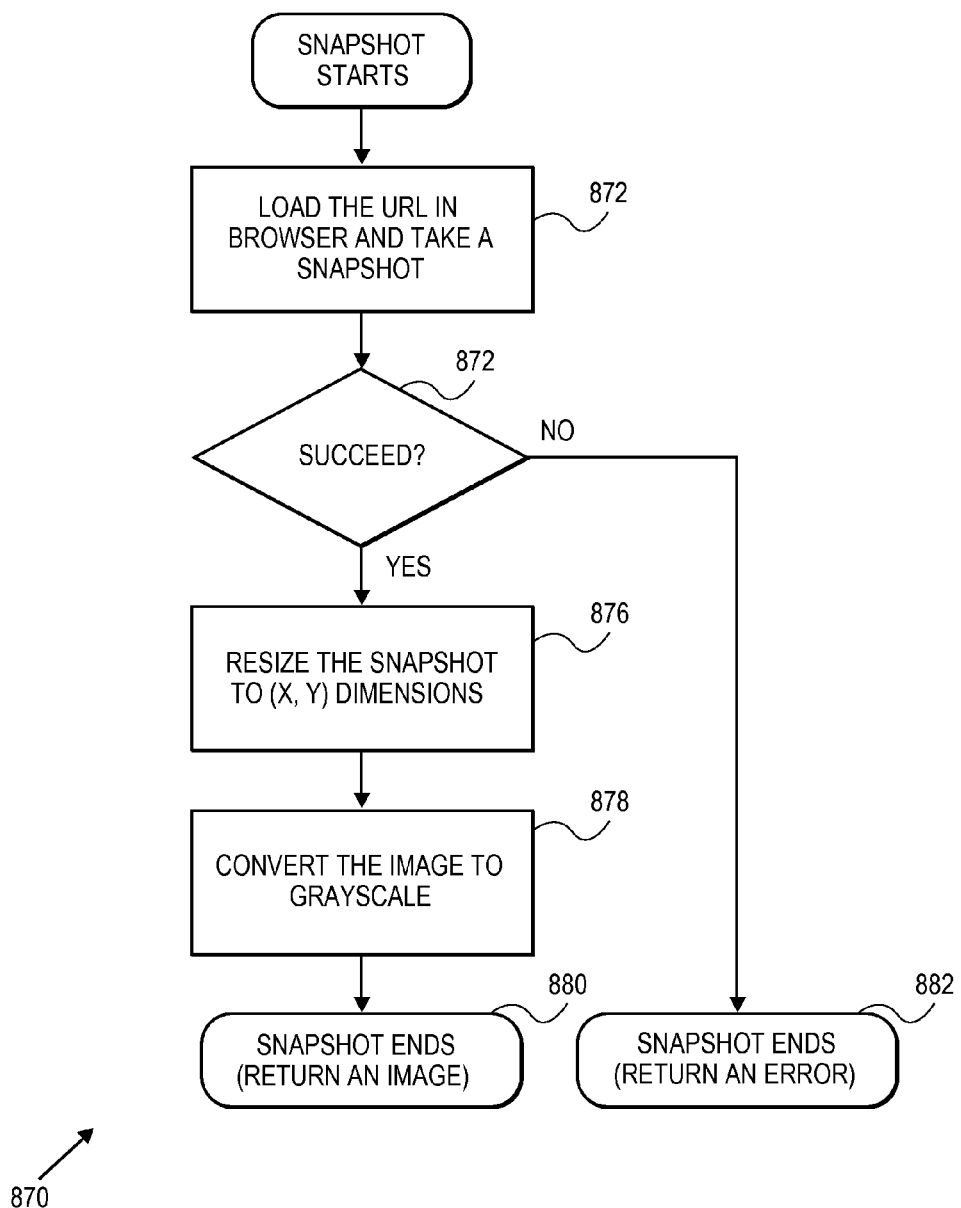
FIG. 11 illustrates one example of the snapshot generation process.

Snapshot generator 828 is a server computer that accepts URLs and creates image snapshots. FIG. 11 illustrates one example of the snapshot generation process 870. The snapshot process uses a browser to load the URL and then take a snapshot image 872. If the snapshot is not successful 874 due to a network problem or other error response from the server, then the process returns an error code 882. Otherwise, the process continues to normalize the snapshot image. Two kinds of normalization are typically performed: the image is first resized 876 into particular X, Y dimensions; and the image is converted into a suitable grayscale 878. Resizing the image and converting it to grayscale helps in reducing noise in the image. Once successful, the process ends 880 and the resulting image is returned.

The present invention may also be used in image spam identification. An image spam message is a message that contains a link to an image that is rendered in an HTML mail reader, an image attached to an e-mail message, or an image embedded in the e-mail message itself. The image is spam or junk that the reader hopes to avoid. Most commonly, the image is an attachment and is often in the GIF format. Prior art techniques use optical character recognition to identify keywords in the image but spammers are using techniques to obfuscate those words and defeat the character recognition. A new technique is desired to identify these spam images.

Firstly, the technique contemplates collecting a large number of spam images, either manually or by some automatic process. Once these images are collected they are normalized (as described above) and then stored in an image spam database (for example, they are converted into GIF format). Once an e-mail message is received that has an image attachment (for example), the image is extracted, normalized and then compared to all of the existing spam images in the database. If any one image in the database has a very high similarity to the incoming image, then that e-mail message is identified as spam e-mail.

Computer System Embodiment

Figure 14A:
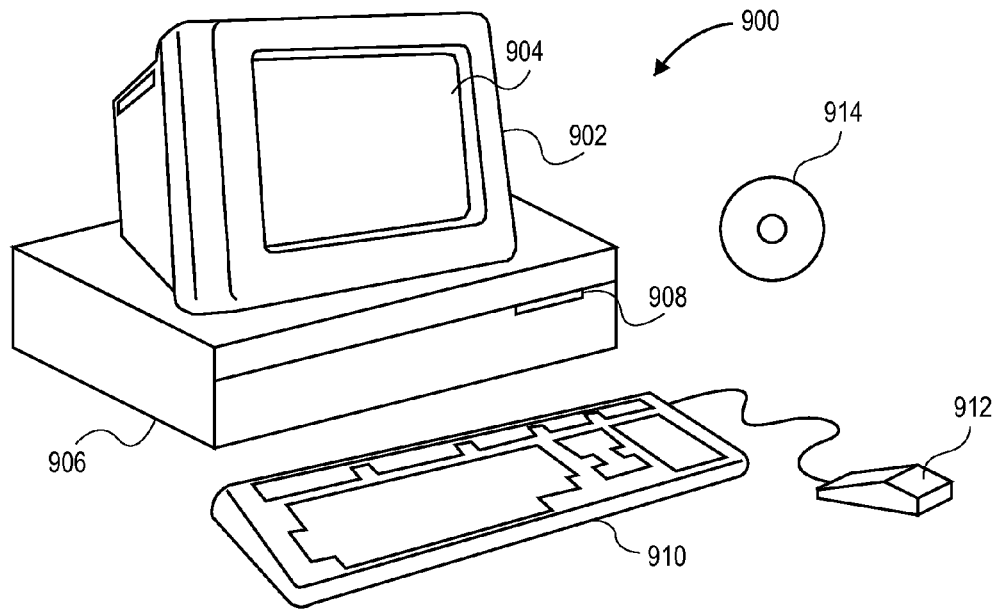
FIGS. 14A and 14B illustrate a computer system suitable for implementing embodiments of the present invention.
Figure 14B:
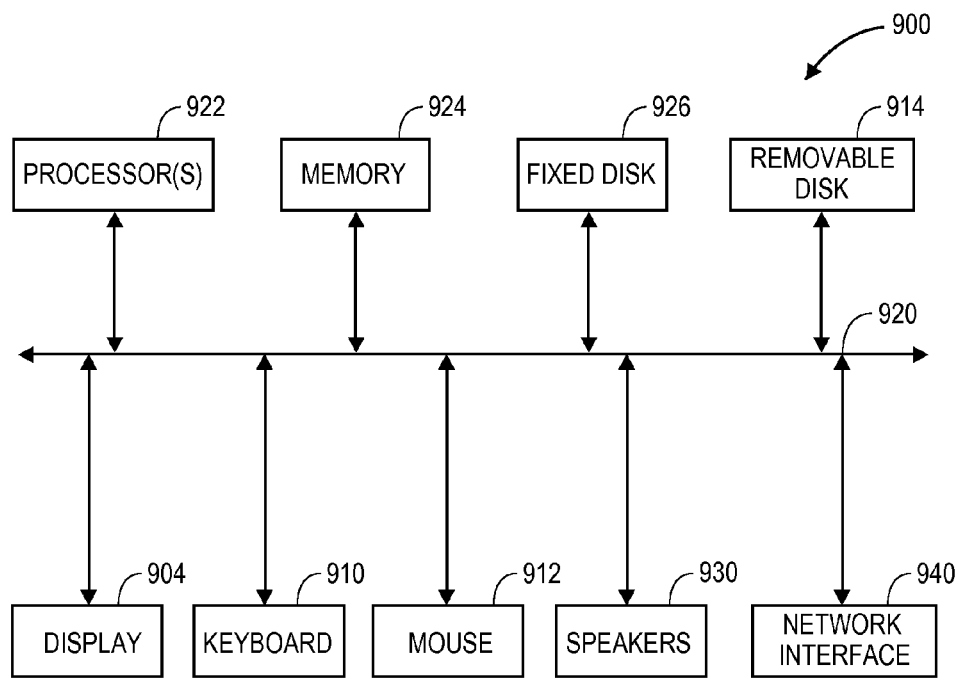

FIGS. 14A and 14B illustrate a computer system 900 suitable for implementing embodiments of the present invention. FIG. 14A shows one possible physical form of the computer system. Of course, the computer system may have many physical forms including an integrated circuit, a printed circuit board, a small handheld device (such as a mobile telephone or PDA), a personal computer or a super computer. Computer system 900 includes a monitor 902, a display 904, a housing 906, a disk drive 908, a keyboard 910 and a mouse 912. Disk 914 is a computer-readable medium used to transfer data to and from computer system 900.

FIG. 14B is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary storage medium (such as a hard disk) that is slower than primary storage. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

We claim:

1. A method of comparing images comprising:

receiving a first image and a second image, each of said images having a plurality of values representing pixel intensities of said images;

creating a horizontal sequence of said values and a vertical sequence of said values for said first image, wherein said horizontal sequence orders said values row-by-row and wherein said vertical sequence orders said values column-by-column;

creating a horizontal sequence of said values and a vertical sequence of said values for said second image, wherein said horizontal sequence orders said values row-by-row and wherein said vertical sequence orders said values column-by-column, wherein the horizontal sequence order for said second image is the same as the horizontal sequence order for the first image, and wherein the vertical sequence order for said second image is consistent with the vertical sequence order for the first image;

determining a horizontal error distance between said horizontal sequences of said first and second images;

determining a vertical error distance between said vertical sequences of said first and second images; and calculating a similarity value using said horizontal and vertical error distances.

2. A method as recited in claim 1 further comprising:
converting said first and second images to grayscale; and
converting said first and second images to a common image format.

3. A method as recited in claim 2 further comprising:
resizing said first and second images to fixed dimensions.

4. A method as recited in claim 1 wherein said determining horizontal and vertical error distances uses an approximate pattern matching algorithm.

5. A method as recited in claim 1 wherein said step of calculating a similarity value also uses lengths of said horizontal and vertical sequences.

6. A method as recited in claim 1 further comprising:
outputting said similarity value as a measure of differences between said images.

7. A method as recited in claim 1 further comprising:
changing a current pixel value to be the same as an immediate preceding pixel value during said steps of creating.

8. A method as recited in claim 1 wherein said first and second images are digital images.

9. A method as recited in claim 1 wherein said first image is a phishing page or is an image spam attachment.

10. A method as recited in claim 1 wherein said images have different aspect ratios, said method further comprising:
adding padding values to said second image such that said images have the same aspect ratio.

11. A method of comparing images comprising:
receiving a first image and a second image, each of said images including a plurality of values representing pixel intensities of said images;

normalizing said first image and normalizing said second image;

creating a horizontal sequence of said values and a vertical sequence of said values for said first image, wherein said horizontal sequence orders said values row-by-row and wherein said vertical sequence orders said values column-by-column;

creating a horizontal sequence of said values and a vertical sequence of said values for said second image, wherein said horizontal sequence orders said values row-by-row and wherein said vertical sequence orders said values column-by-column, wherein the horizontal sequence order for said second image is the same as the horizontal sequence order for the first image, and wherein the vertical sequence order for said second image is consistent with the vertical sequence order for the first image;

a step for performing the function of determining a horizontal error distance using said horizontal sequences and of determining a vertical error distance using said vertical sequences; and calculating a similarity value using said determined horizontal and vertical error distances.

12. A method as recited in claim 11 wherein said step of normalizing includes:
converting said first and second images to grayscale; and
converting said first and second images to a common image format.

13. A method as recited in claim 12 wherein said step of normalizing further includes:
resizing said first and second images to fixed dimensions, wherein said step of converting to grayscale occurs before said steps of converting to a common image format and resizing.

14. A method as recited in claim 11 wherein said function of determining horizontal and vertical error distances uses an approximate pattern matching algorithm.

15. A method as recited in claim 11 wherein said step of calculating a similarity value also uses lengths of said horizontal and vertical sequences.

16. A method as recited in claim 11 further comprising:
outputting said similarity value as a measure of differences between said images.

17. A method as recited in claim 11 further comprising:
changing a current pixel value to be the same as an immediate preceding pixel value during said steps of creating.

18. A method as recited in claim 11 wherein said first and second images are digital images.

19. A method as recited in claim 11 wherein said first image is a phishing page or is an image spam attachment.

20. A method as recited in claim 11 wherein said images have different aspect ratios, said method further comprising:
adding padding values to said second image such that said images have the same aspect ratio.

21. A non-transitory computer-readable medium comprising computer code for comparing images said computer code of said non-transitory computer-readable medium effecting the following:
receiving a first image and a second image, each of said images including a plurality of values representing pixel intensities of said images;

normalizing said first image and normalizing said second image;

creating a horizontal sequence of said values and a vertical sequence of said values for said first image, wherein said horizontal sequence orders said values row-by-row and wherein said vertical sequence orders said values column-by-column;

creating a horizontal sequence of said values and a vertical sequence of said values for said second image, wherein said horizontal sequence orders said values row-by-row and wherein said vertical sequence orders said values column-by-column, wherein the horizontal sequence order for said second image is the same as the horizontal sequence order for the first image, and wherein the vertical sequence order for said second image is consistent with the vertical sequence order for the first image;

a step for performing the function of determining a horizontal error distance using said horizontal sequences and of determining a vertical error distance using said vertical sequences; and calculating a similarity value using said determined horizontal and vertical error distances.

22. A method as recited in claim 1, wherein the pixel intensities for the first image and second image include all the pixel intensities of the first image and the second image.

23. A method as recited in claim 1, wherein the horizontal sequences of the first and second images order the values from left and right within each row, row-by-row, beginning with the top row.

24. A method as recited in claim 1, wherein the vertical sequences of the first and second images order the values from top to bottom within each column, column-by-column, beginning with the leftmost column.

25. A method as recited in claim 11, wherein the pixel intensities for the first image and second image include all the pixel intensities of the first image and the second image.

26. A method as recited in claim 11, wherein the horizontal sequences of the first and second images order the values from left and right within each row, row-by-row, beginning with the top row.

27. A method as recited in claim 11, wherein the vertical sequences of the first and second images order the values from top to bottom within each column, column-by-column, beginning with the leftmost column.

28. A method as recited in claim 21, wherein the pixel intensities for the first image and second image include all the pixel intensities of the first image and the second image.

29. A method as recited in claim 21, wherein the horizontal sequences of the first and second images order the values from left and right within each row, row-by-row, beginning with the top row.

30. A method as recited in claim 21, wherein the vertical sequences of the first and second images order the values from top to bottom within each column, column-by-column, beginning with the leftmost column.

* * * * *

UNITED STATES PATENT AND TRADEMARK OFFICE
CERTIFICATE OF CORRECTION

PATENT NO. : 8,175,387 B1
APPLICATION NO. : 11/857845
DATED : May 8, 2012
INVENTOR(S) : Hsieh et al.

It is certified that error appears in the above-identified patent and that said Letters Patent is hereby corrected as shown below:

In the Claims

Column 12, line 62:   change "image and second image" to --image and the second image--
Column 12, line 66:   change "left and right" to --left to right--
Column 13, line 7:    change "image and second image" to --image and the second image--
Column 13, line 11:   change "left and right" to --left to right--
Column 14, line 4:    change "image and second image" to --image and the second image--
Column 14, line 8:    change "left and right" to --left to right--

Signed and Sealed this
Eleventh Day of June, 2013

Teresa Stanek Rea
*Acting Director of the United States Patent and Trademark Office*